United States Patent
Kakishima

(10) Patent No.: US 12,108,359 B2
(45) Date of Patent: Oct. 1, 2024

(54) METHOD, INFORMATION PROCESSING APPARATUS, AND SYSTEM

(71) Applicant: INTERNET INITIATIVE JAPAN INC., Tokyo (JP)

(72) Inventor: Jun Kakishima, Tokyo (JP)

(73) Assignee: INTERNET INITIATIVE JAPAN INC., Tokyo (JP)

( * ) Notice: Subject to any disclaimer, the term of this patent is extended or adjusted under 35 U.S.C. 154(b) by 0 days.

(21) Appl. No.: 18/564,979

(22) PCT Filed: Aug. 19, 2022

(86) PCT No.: PCT/JP2022/031331
§ 371 (c)(1),
(2) Date: Nov. 28, 2023

(87) PCT Pub. No.: WO2024/038576
PCT Pub. Date: Feb. 22, 2024

(65) Prior Publication Data
US 2024/0267871 A1    Aug. 8, 2024

(51) Int. Cl.
*H04W 4/00* (2018.01)
*H04W 36/14* (2009.01)
(Continued)

(52) U.S. Cl.
CPC ......... *H04W 60/04* (2013.01); *H04W 36/142* (2023.05); *H04W 36/302* (2023.05)

(58) Field of Classification Search
CPC .. H04W 60/04; H04W 36/142; H04W 36/302
(Continued)

(56) References Cited

U.S. PATENT DOCUMENTS 5,901,352 A * 5/1999 St-Pierre ................. H04L 61/00
455/433
6,628,628 B1 * 9/2003 Yamazaki ........... H04W 56/006
370/320
(Continued)

FOREIGN PATENT DOCUMENTS

| JP | 2021-503783 A | 2/2021 |
| JP | 2021-121113 A | 8/2021 |
| WO | 2021/132502 A1 | 7/2021 |

OTHER PUBLICATIONS

"3rd Generation Partnership Project; Technical Specification Group Services and System Aspects; System Architecture for the 5G System; Stage 2 (Release 16)", 3GPP TS 23.501 V16.7.0 (Dec. 2020), 3GPP A Global Initiative.
(Continued)

*Primary Examiner* — Amancio Gonzalez
(74) *Attorney, Agent, or Firm* — MICHAEL BEST & FRIEDRICH LLP

(57) ABSTRACT

Seamless communication between mobile communication networks complying with different standards is enabled. A method including a first step group executed by a processor of an information processing apparatus, the first step group including the steps of: acquiring a position registration request from a user terminal; judging whether an identification number of a first communication carrier included in the position registration request is different from an identification number of a communication carrier associated with the user terminal, which is registered with a subscriber database; and instructing a mobility management node to set a first network of the first communication carrier when the identification number of the first communication carrier is different from the identification number of the communication carrier registered with the subscriber database.

7 Claims, 9 Drawing Sheets

(51) Int. Cl.
*H04W 36/30* (2009.01)
*H04W 60/04* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 6,980,794 | B1* | 12/2005 | Hamada | H04M 15/83 |
| | | | | 455/406 |
| 7,480,507 | B2* | 1/2009 | Kuroda | H04W 60/00 |
| | | | | 455/433 |
| 8,665,730 | B2* | 3/2014 | Ozaki | H04W 24/06 |
| | | | | 455/566 |
| 9,167,558 | B2* | 10/2015 | Haney | H04W 64/003 |
| 9,288,673 | B2* | 3/2016 | Abbott | H04W 24/02 |
| 11,146,942 | B2* | 10/2021 | Gotou | H04W 48/16 |
| 11,930,393 | B2* | 3/2024 | Zhu | H04W 76/12 |
| 2008/0171533 | A1* | 7/2008 | Sharp | H04W 88/16 |
| | | | | 455/410 |
| 2013/0189941 | A1* | 7/2013 | Abbott | H04W 24/02 |
| | | | | 455/411 |
| 2014/0256315 | A1* | 9/2014 | Drevon | H04W 88/06 |
| | | | | 455/552.1 |
| 2014/0295895 | A1* | 10/2014 | Haney | H04W 72/121 |
| | | | | 455/457 |
| 2015/0189508 | A1* | 7/2015 | Abbott | H04W 4/021 |
| | | | | 455/411 |
| 2020/0344648 | A1 | 10/2020 | Kawasaki et al. | |
| 2020/0344678 | A1 | 10/2020 | Kunz et al. | |
| 2020/0351729 | A1* | 11/2020 | Rastegardoost | H04W 36/0072 |
| 2020/0359271 | A1 | 11/2020 | Lee et al. | |
| 2021/0211883 | A1 | 7/2021 | Velev | |
| 2021/0329539 | A1 | 10/2021 | Surisetty et al. | |
| 2021/0400576 | A1 | 12/2021 | Le et al. | |
| 2023/0385272 | A1* | 11/2023 | Dominguez | H04M 15/49 |

OTHER PUBLICATIONS

"3rd Generation Partnership Project; Technical Specification Group Services and System Aspects; Procedures for the 5G System (5GS); Stage 2 (Release 16)", 3GPP TS 23.502 V16.7.1 (Jan. 2021), 3GPP a Global Initiative.

International Search Report issued in Application No. PCT/JP2022/031331, mailed Oct. 11, 2022.

Extended Search Report issued in European Application No. 22940964.4, mailed Aug. 9, 2024.

* cited by examiner

| IDENTIFICATION NUMBER OF UE | LOCATION INFORMATION | RADIO TYPE |
|---|---|---|
| 0 0 0 1 | AMF01.epc.mnc02.mcc440.3gppnetwork.org | 5G |

| IDENTIFICATION NUMBER OF UE | LOCATION INFORMATION | RADIO TYPE |
|---|---|---|
| 0 0 0 1 | MME01.epc.mnc01.mcc440.3gppnetwork.org | 4G |

METHOD, INFORMATION PROCESSING APPARATUS, AND SYSTEM

TECHNICAL FIELD

The present disclosure relates to a method, an information processing apparatus, and a system. More specifically, the present disclosure relates to a method that enables communication between mobile communication networks complying with different standards, an information processing apparatus, and a system.

BACKGROUND ART

Standards for wireless networks provided by communication carriers are classified in 4G standard and 5G standard. Each of both standards is similarly configured, including a user terminal (user equipment), a RAN (radio access network), and a mobile core network. In the mobile core network, a user plane network apparatus group is arranged on a virtualization infrastructure of a control plane network apparatus group.

Conventionally, seamless communication between networks complying with different standards, for example, between a 5G SA (standalone) network and a 4G network has been realized by an architecture specified by 3rd Generation Partnership Project (3GPP) which is an international standardization body (FIG. 4.3.1-1 of NPL 1: Non-roaming architecture for interworking between 5GS and EPC/E-UTRAN).

FIG. 6 exemplifies the specified architecture. This architecture is provided with various kinds of components constituting a 4G system (HSS (Home Subscriber Server), PCRF (Policy and Charging Rules Function), PGW-C (Packet data network GateWay Control plane), and PGW-U (Packet data network GateWay User plane)) and various kinds of components constituting a 5G SA system (a UDM (Unified Data Management), a PCF (Policy Control Function), an SMF (Session Management Function), and a UPF (User Plane Function)). In this architecture, similar functions between the components constituting the 4G system and the components constituting the 5G system are physically accommodated in the same server. Specifically, "the HSS and the UDM", "the PCRF and the PCF", "the PGW-C and the SMF", and "the PGW-U and the UPF" are physically accommodated in the same servers, respectively. Further, the components constituting the 4G system and the components constituting the 5G system are possessed by the same communication carrier.

As shown in FIG. 6, an interface (N26) exists between the AMF of 5G SA and the MME of 4G. In the architecture of FIG. 6, the interface (N26) has been used to transmit/receive information about user terminals between the AMF and the MME and realize seamless communication between the 5G SA network and the 4G network.

NPL 1 shows a sequence for realizing seamless communication between a 4G network and a 5G network at the time of a user terminal moving from a 4G area to a 5G area, which is specified by the international standardization body 3GPP (FIG. 4.11.1.2.2.2-1 of NPL 2: EPS to 5GS handover using N26 interface, preparation phases). FIG. 7 exemplifies the sequence.

NPL 2 shows a sequence for realizing seamless communication between a 5G network and a 4G network at the time of a user terminal moving from a 5G area to a 4G area, which is specified by the international standardization body 3GPP (FIG. 4.11.1.2.1-1 of NPL 2: 5GS to EPS handover for single-registration mode with N26 interface). FIG. 8 exemplifies the sequence.

CITATION LIST

Non Patent Literature

NPL 1: 3GPP TS 23.501 V16.7.0; 3rd Generation Partnership Project; Technical Specification Group Services and System Aspects; System Architecture for the 5G System; Stage 2 (Release 16)

NPL 2: 3GPP TS 23.502 V16.7.1; 3rd Generation Partnership Project; Technical Specification Group Services and System Aspects; Procedures for the 5G System (5GS); Stage 2 (Release 16)

SUMMARY OF INVENTION

Technical Problem

As described above, however, components constituting a 4G system and components constituting a 5G system are possessed by the same carrier in the conventional configuration, and it is not assumed that the components of the systems are possessed by different carriers, respectively. Therefore, in order for a communication carrier to provide users with mutual connection between 4G and 5G networks, it is necessary for the communication carrier to possess the system components of both of 4G and 5G.

Further, if a 4G system and a 5G system are possessed by different carriers, each of the communication carriers needs a huge plant and equipment investment in order to provide users with services using a system of a communication standard that the communication carrier does not possess. In order to provide such services, a communication carrier needs mutual communication using an interface (N26) between the communication carrier's AMF or MME, and MME or AMF possessed by the other communication carrier. For example, when A Communication Carrier and B Communication Carrier possess 100 AMFs and 50 MMEs, respectively, mutual connection is required at 50×100=5000 positions.

An object of the present disclosure is to enable seamless communication between mobile communication networks complying with different standards.

Another object of the present disclosure is to, even if mobile communication networks complying with different standards are possessed by different communication carriers, enable seamless communication between the mobile communication networks.

Solution to Problem

In order to solve the above subjects, one aspect of the present invention provides a method comprising a first step group executed by a processor of an information processing apparatus, the first step group comprising the steps of: acquiring a position registration request from a user terminal; judging whether an identification number of a first communication carrier included in the position registration request is different from an identification number of a communication carrier associated with the user terminal, which is registered with a subscriber database; and instructing a mobility management node to set a first network of the first communication carrier when the identification number of the first communication carrier is different from the identification number of the communication carrier registered with the subscriber database.

Another aspect of the present invention provides an information processing apparatus comprising a storage unit storing an instruction and a processor, wherein, by executing the instruction stored in the storage unit, the processor executes the steps of: acquiring a position registration request from a user terminal; judging whether an identification number of a first communication carrier included in the position registration request is different from an identification number of a communication carrier associated with the user terminal, which is registered with a subscriber database; and instructing a mobility management node to set a first network of the first communication carrier when the identification number of the first communication carrier is different from the identification number of the communication carrier registered with the subscriber database.

Another aspect of the present invention provides a system comprising a first information processing apparatus and a second information processing apparatus, the first information processing apparatus comprising a first storage unit storing a first instruction and a first processor, the second information processing apparatus comprising a second storage unit storing a second instruction and a second processor, wherein, by executing the first instruction stored in the first storage unit, the first processor executes a first step group, the first step group comprising the steps of: acquiring a position registration request from a user terminal; judging whether an identification number of a first communication carrier included in the position registration request is different from an identification number of a communication carrier associated with the user terminal, which is registered with a subscriber database; and instructing a mobility management node to set a first network of the first communication carrier when the identification number of the first communication carrier is different from the identification number of the communication carrier registered with the subscriber database; and, by executing the second instruction stored in the second storage unit, the second processor executes the step of, when signal strength from a base station of the first network of the first communication carrier is equal to or larger than a predetermined value or larger than signal strength from a base station of a second network of the communication carrier registered with the subscriber database, transmitting the position registration request to the first information processing apparatus.

BRIEF DESCRIPTION OF DRAWINGS

FIG. 4A shows an example of a subscriber database according to the one embodiment of the present disclosure.

FIG. 4B shows an example of the subscriber database according to the one embodiment of the present disclosure.

DESCRIPTION OF EMBODIMENTS

Figure 1:
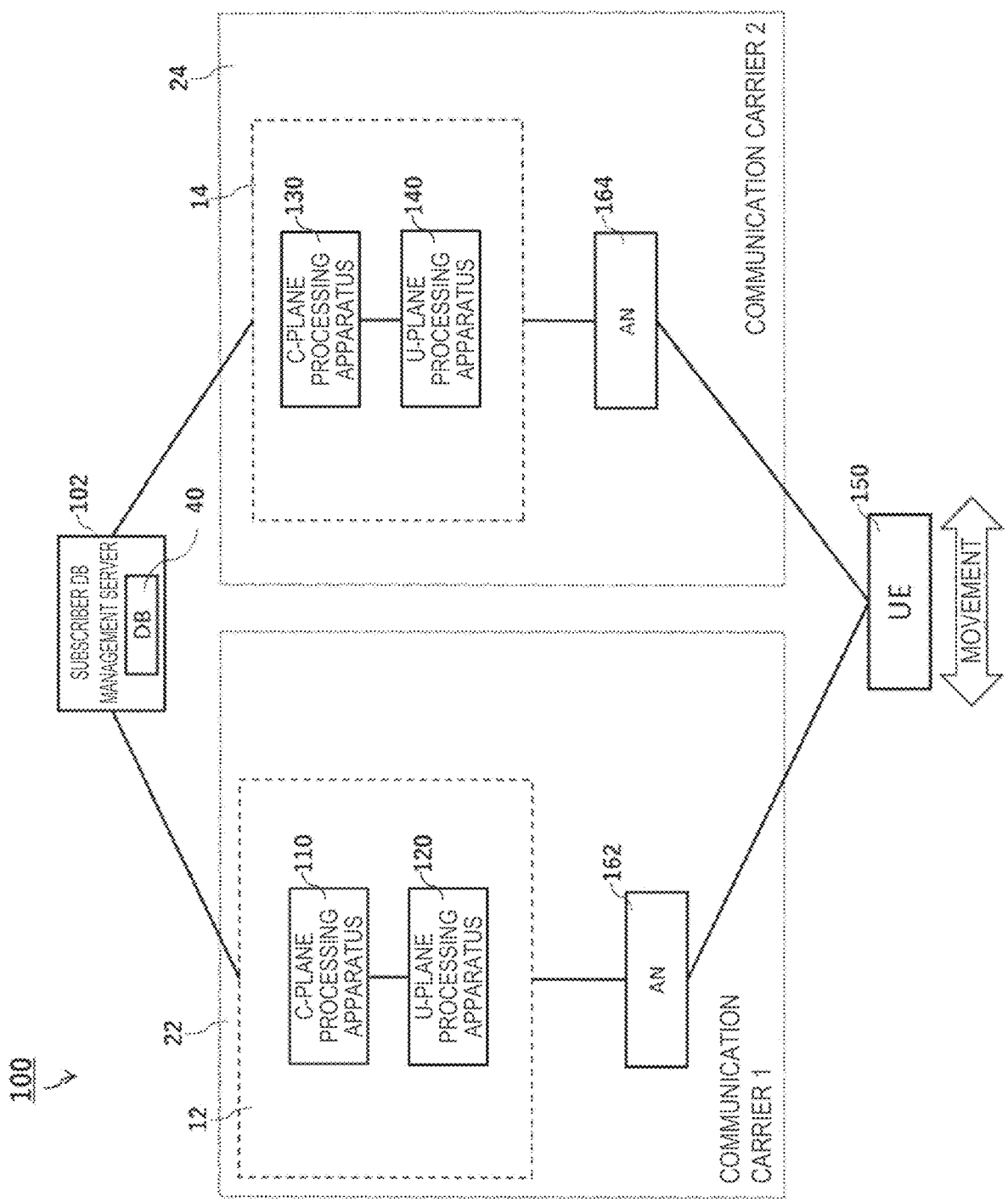
FIG. 1 is a schematic configuration diagram of a network switching system in one embodiment of the present disclosure.

Description of Embodiments of the Present Invention

First, description will be made by enumerating items of content of embodiments of the present invention. One embodiment of the present invention is configured as below.
<Item 1>
A method including a first step group executed by a processor of an information processing apparatus (102), the first step group including the steps of:
  acquiring a position registration request from a user terminal (150) (S304, S504);
  judging whether an identification number of a first communication carrier included in the position registration request is different from an identification number of a communication carrier associated with the user terminal, which is registered with a subscriber database (40) (S306, S506); and
  instructing a mobility management node (118, 138) to set a first network of the first communication carrier when the identification number of the first communication carrier is different from the identification number of the communication carrier registered with the subscriber database (S308, S508).
<Item 2>
  The method according to Item 1, wherein
  the first network and a second network corresponding to the identification number of the communication carrier registered with the subscriber database comply with different communication standards.
<Item 3>
  The method according to Item 2, wherein
  the first step group further includes the step of, after setting of the first network is completed, receiving a notification of completion of data channel setting for the first network from the mobility management node (S318, S518).
<Item 4>
  The method according to Item 3, wherein
  the first step group further includes the step of, in response to receiving the data channel setting completion notification from the mobility management node, transmitting a position registration completion notification and a parameter of switching from the second network to the first network, to the user terminal (S320, S520).
<Item 5>
  The method according to Item 4, including a second step group executed by the user terminal (150), the second step group including the step of, in response to receiving the position registration completion notification and the switching parameter, switching a connection destination from the second network to the first network (S322, S522).
<Item 6>
  The method according to Item 5, wherein
  the first step group further includes the step of, in response to receiving a notification showing that communication with the first network has been started from the user terminal, transmitting an instruction to disconnect a session to the second network, to a node (136, 118) performing session management of the second network (S328, S528).

<Item 7>
The method according to Item 6, wherein
the second step group further includes the step of, when signal strength from a base station of the first network is equal to or larger than a predetermined value or larger than signal strength from a base station of the second network, transmitting the position registration request to the information processing apparatus (S304, S504).

<Item 8>
The method according to any one of Items 2 to 7, wherein
the information processing apparatus (102) is shared by the first network and the second network, and the first network and the second network separately include control plane processing apparatuses and user plane processing apparatuses, respectively.

<Item 9>
An information processing apparatus including a storage unit storing an instruction and a processor, wherein
by executing the instruction stored in the storage unit, the processor executes the steps of:
acquiring a position registration request from a user terminal;
judging whether an identification number of a first communication carrier included in the position registration request is different from an identification number of a communication carrier associated with the user terminal, which is registered with a subscriber database; and
instructing a mobility management node to set a first network of the first communication carrier when the identification number of the first communication carrier is different from the identification number of the communication carrier registered with the subscriber database.

<Item 10>
A system including a first information processing apparatus and a second information processing apparatus, the first information processing apparatus including a first storage unit storing a first instruction and a first processor, the second information processing apparatus including a second storage unit storing a second instruction and a second processor, wherein
by executing the first instruction stored in the first storage unit, the first processor executes a first step group, the first step group including the steps of:
acquiring a position registration request from a user terminal;
judging whether an identification number of a first communication carrier included in the position registration request is different from an identification number of a communication carrier associated with the user terminal, which is registered with a subscriber database; and
instructing a mobility management node to set a first network of the first communication carrier when the identification number of the first communication carrier is different from the identification number of the communication carrier registered with the subscriber database; and
by executing the second instruction stored in the second storage unit, the second processor executes the step of, when signal strength from a base station of the first network of the first communication carrier is equal to or larger than a predetermined value or larger than signal strength from a base station of a second network of the communication carrier registered with the subscriber database, transmitting the position registration request to the first information processing apparatus.

Details of Embodiments of the Present Invention

Hereinafter, specific embodiments to which the present invention is applied will be described in details with reference to drawings. The present disclosure is not limited to the exemplification below, and it is intended that all of changes shown by the claims and within meaning and a scope equal to the claims are included in the present disclosure. In the description below, the same components will be given the same reference signs in each drawing, and duplicated description will not be repeated.

FIG. 1 is a schematic configuration diagram of a network switching system 100 in one embodiment of the present disclosure. A user terminal (UE) 150 is configured to be capable of switching a connection destination network between a first network 22 provided by a communication carrier 1 and a second network 24 provided by a communication carrier 2 to perform communication as it moves. The configuration is just an exemplification, and the number of communication carriers is not limited to two. A network switching instruction is given by a subscriber database management server 102. It is assumed that the first network 22 complies with a first communication standard, and the second network 24 complies with a second communication standard different from the communication standard of the first network 22. The network switching system 100 is provided with the subscriber database management server 102, the first network 22, the second network 24, and the UE 150.

The subscriber database management server 102 can be realized by an information processing apparatus in a well-known configuration. The subscriber database management server 102 is a computer or a server computer arranged on a cloud. The subscriber database management server 102 is configured with a computer having hardware resources such as a CPU (a processor), a ROM (read-only memory), a RAM (random access memory), and an HDD (hard disk drive). The CPU executes various kinds of programs stored in a storage unit. Thereby, information processing by software is realized by using the hardware resources. The various kinds of programs can be stored in various kinds of memories such as the ROM and the RAM and a recording medium such as the HDD.

The subscriber database management server 102 is provided with a UDR (unified data repository), and the UDR is shared between the communication carrier 1 and the communication carrier 2. The subscriber database management server 102 determines movement of the UE 150 based on a position registration request acquired from the UE 150 and outputs a network switching setting instruction.

The subscriber database management server 102 stores a subscriber database 40 in the UDR. The subscriber database 40 is a collection of pieces of information about subscribers having contracts with both of the communication carrier 1 and the communication carrier 2, which is stored in a memory or the HDD (hard disk drive), which is the storage unit, and arranged in a manner of enabling search or accumulation. The subscriber database 40 holds data in which an identification number of the UE 150, location information about the UE 150, and a radio type are associated. The identification number of the UE 150 is, for example, an IMSI (international mobile subscriber identity)

assigned to a mobile phone line contract. Details of the subscriber database 40 will be described later with reference to FIGS. 4A and 4B.

The UE 150 only needs to have a SIM, and is realized, for example, as a mobile terminal such as a smartphone, a PDA (personal digital assistant), a tablet computer, or a laptop computer (a so-called note personal computer). The UE 150 can be realized by an information processing apparatus in a well-known configuration. The UE 150 has hardware resources such as a CPU (a processor), a ROM (read-only memory), a RAM (random access memory), and an HDD (hard disk drive). The CPU executes various kinds of programs stored in a storage unit. Thereby, information processing by software is realized by using the hardware resources. The various kinds of programs can be stored in various kinds of memories such as the ROM and the RAM and a recording medium such as the HDD.

The UE 150 can communicate with a core network 12 via a first access network 162 when performing communication using the first network 22 of the communication carrier 1, and can communicate with a core network 14 via a second access network 164 when performing communication using the second network 24 of the communication carrier 2.

The access network (AN) 162 (164) is a network configured with wireless base stations and wireless line control apparatuses, which is located between the core network 12 (14) and the UE 150. When a radio wave transmitted by a base station of the access network 162 (164) reaches the UE 150 with predetermined power or higher, the UE 150 can establish connection with the access network 162 (164) and communicate with the core network 12 (14).

The core network 12 is provided with a control plane processing apparatus 110 and a user plane processing apparatus 120. The core network 14 is provided with a control plane processing apparatus 130 and a user plane processing apparatus 140. Here, a control plane processing apparatus refers to a network apparatus group that transmits/receives control signals for communication establishment and the like. A user plane processing apparatus refers to a network apparatus group that transmits/receives user data. In the present disclosure, the control plane processing apparatuses 110 and 130 and the user plane processing apparatuses 120 and 140 are separately configured for the communication carriers 1 and 2, respectively. Each of the control plane processing apparatuses 110 and 130 and the user plane processing apparatuses 120 and 140 can be realized by an information processing apparatus in a well-known configuration similarly to the subscriber database management server 102.

According to the present disclosure, even if the first network 22 complying with the first communication standard and the second network 24 complying with the second communication standard are possessed by different communication carriers, the UE 150 can make a seamless connection between the first network 22 and the second network 24 via the subscriber database management server 102. That is, even if a certain communication carrier provides only a network complying with one communication standard (for example, 5G), the UE 150 can automatically switch and connect to a network complying with another communication standard (for example, 4G) provided by another communication carrier.

Figure 2:
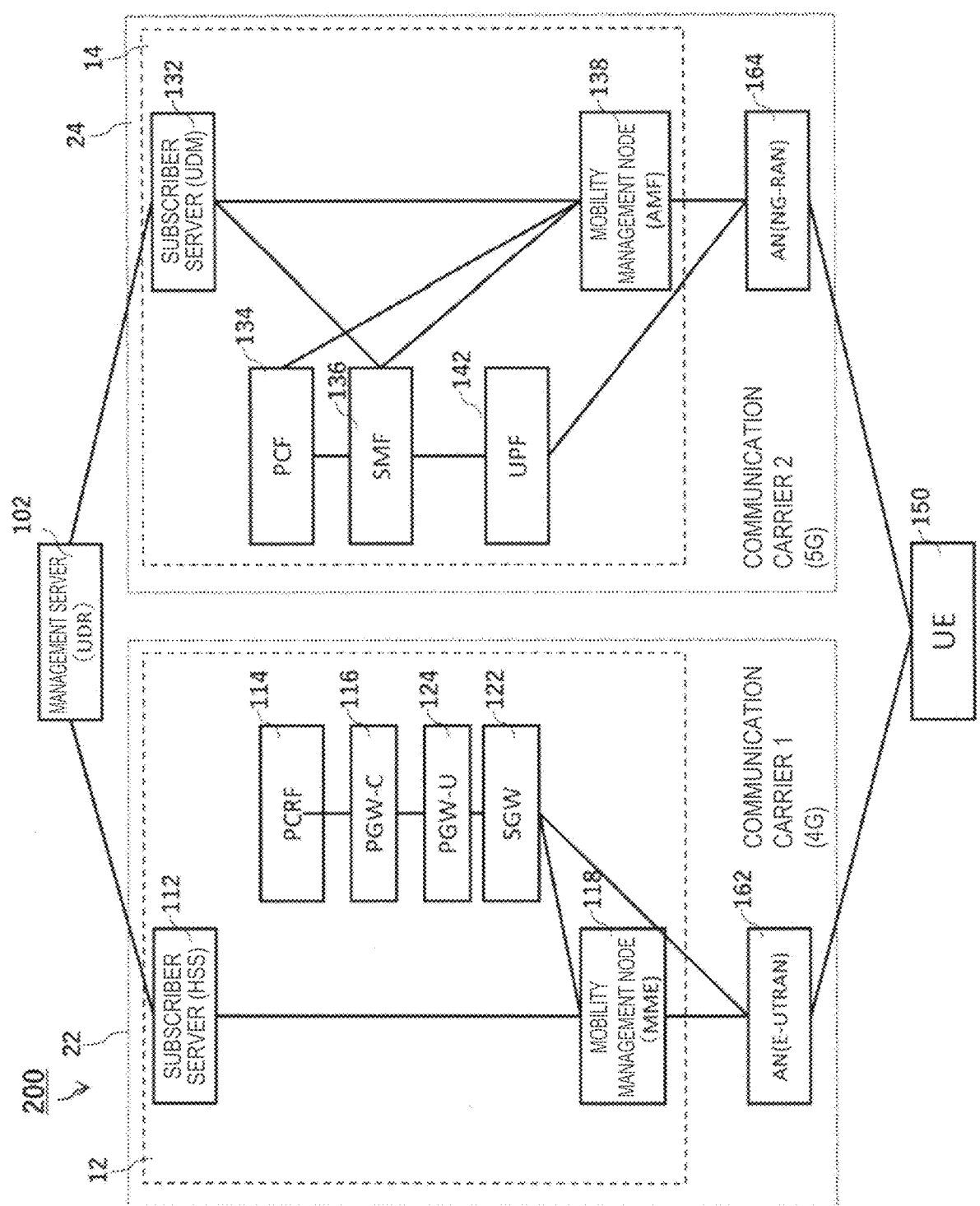
FIG. 2 shows a detailed configuration example of the network switching system according to the one embodiment of the present disclosure.

FIG. 2 shows a detailed configuration example of a network switching system 200 according to the one embodiment of the present disclosure. The network switching system 200 of FIG. 2 corresponds to the network switching system 100 of FIG. 1. According to FIG. 2, the first network 22 complies with the 4th generation (4G) communication standard, and the second network 24 complies with the 5th generation (5G) communication standard.

In the first network 22 complying with the 4G communication standard, the core network 12 is provided with at least a subscriber server (HSS: Home Subscriber Server) 112, a PCRF (Policy and Charging Rules Function) 114, a PGW-C (Packet data network GateWay Control plane) 116, a mobility management node (MME: Mobility Management Entity) 118 that correspond to the control plane processing apparatus 110 of FIG. 1. Further, the core network 12 is provided with at least an SGW (Serving Gateway) 122 and a PGW-U (Packet data network GateWay User plane) 124 that correspond to the user plane processing apparatus 120 of FIG. 1. The access network 162 is an E-UTRAN (Evolved Universal Terrestrial Radio Access Network). Each of the nodes of the PCRF 114, the PGW-C 116, the PGW-U 124, the SGW 122, and the MME 118 may be a logical node or may be a physical node. That is, functions may be concentrated in one apparatus or may be distributed among a plurality of separate apparatuses. The first network 22 is not limited to the configuration but may include other accompanying components.

The subscriber server (HSS) 112 is an apparatus in 4G, which manages contract information and authentication information about users, and notifies the mobility management node 118 of the information by being triggered by position registration.

The PCRF 114 is a node that performs control for QoS and accounting for user data transfer in 4G. The PGW-C 116/the PGW-U 124, the SGW 122, and the E-UTRAN 162 are notified of a QoS value decided by the PCRF 114.

The PGW-C 116 is a node that provides a gateway control plane function in 4G.

The PGW-U 124 is a node that provides a gateway user plane function in 4G.

The SGW 122 is a node which is connected to the E-UTRAN 162 to transfer U-plane data between the E-UTRAN 162 and the PGW-U 124.

The mobility management node (MME) 118 is a node that provides mobility control, session management and the like, and performs movement control for position registration, paging, handover, and the like, and establishment or deletion of a bearer (a data channel) BR.

In the second network 24 complying with the 5G communication standard, the core network 14 is provided with at least a subscriber server (UDM: Unified Data Management) 132, a PCF (Policy Control Function) 134, an SMF (Session Management Function) 136, a mobility management node (AMF: Access and Mobility Management Function) 138 that are the control plane processing apparatus 130 of FIG. 1. Further, the core network 14 is provided with at least a UPF (User Plane Function) 142 that corresponds to the user plane processing apparatus 140 of FIG. 1. The access network 164 is an NG-RAN (Next Generation Radio Access Network). Each of the nodes of the PCF 134, the SMF 136, the UPF 142, and the AMF 138 may be a logical node or may be a physical node. That is, functions may be concentrated in one apparatus or may be distributed among a plurality of separate apparatuses. The second network 24 is not limited to the configuration but may include other accompanying components.

The subscriber server (UDM) 132 is an apparatus in 5G, which manages contract information and authentication information about users, and notifies the mobility management node of the information by being triggered by position registration.

The PCF 134 is a node that provides a policy control function in 5G.

The SMF 136 is a node that provides a session management function in 5G and is in charge of session management.

The UPF 142 is a node that provides a user plane function in 5G.

The mobility management node (AMF) 138 is a node that provides mobility control and the like in 5G, and performs movement control for position registration, paging, handover, and the like, and establishment or deletion of a bearer (a data channel) BR.

In the present disclosure, even if there is not mutual connection between the MME 118 of the communication carrier 1 and the AMF 138 of the communication carrier 2, the network switching system 200 can provide the UE 150 with seamless connection switching between the first network 22 and the second network.

First Embodiment

Figure 3:
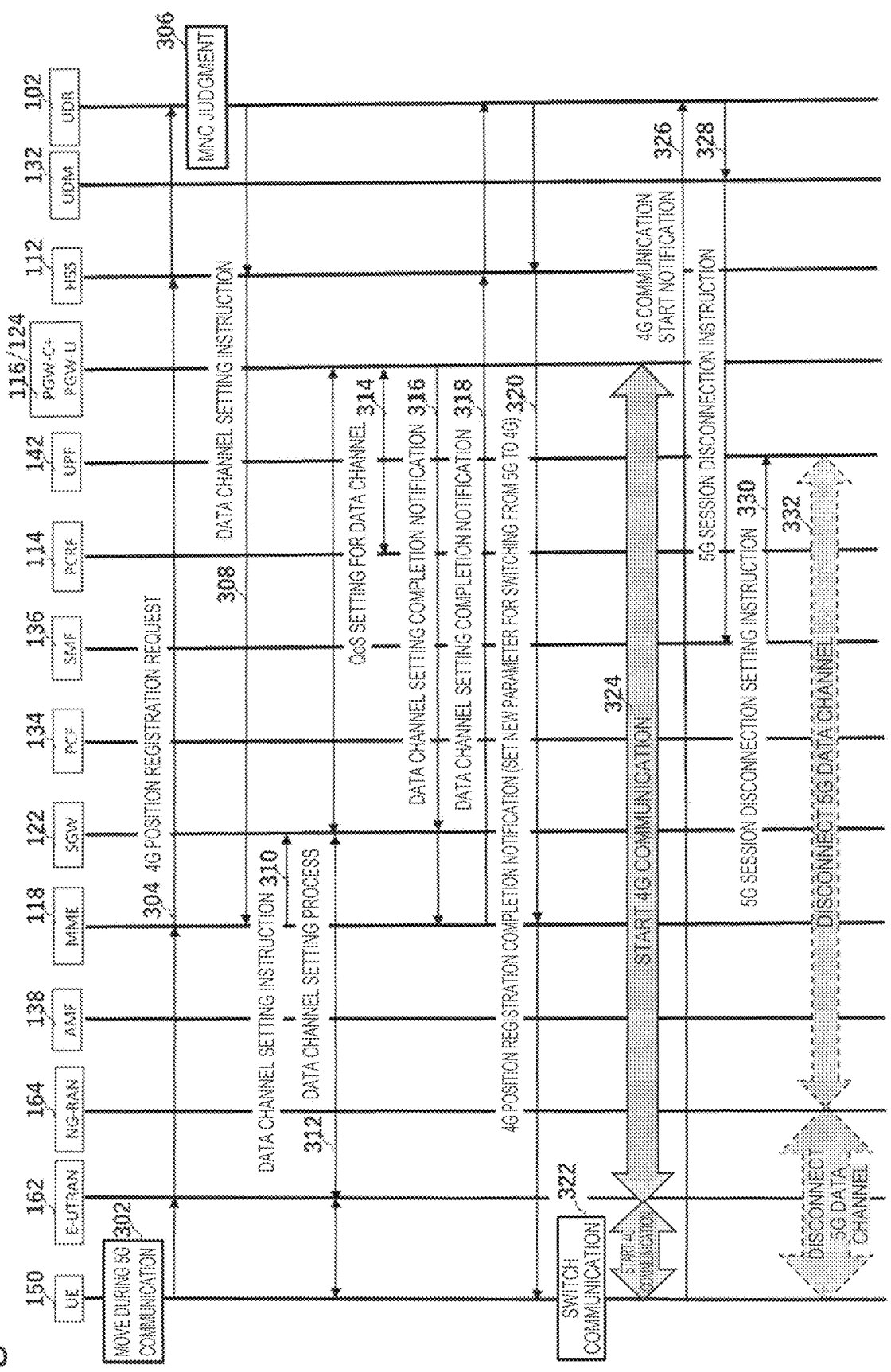
FIG. 3 is a sequence diagram of the network switching system according to the one embodiment of the present disclosure.

FIG. 3 is a sequence diagram of the network switching system 200 shown in FIG. 2 according to the one embodiment of the present disclosure. In the present embodiment, it is assumed that the first network 22 provided by the communication carrier 1 and the second network 24 provided by the communication carrier 2 comply with 4G and 5G, respectively. In the first embodiment, description will be made on an example of the UE 150 moving from a 5G coverage area to a 4G coverage area.

It is assumed that, prior to processes, the UE 150 is connected to a 5G network, which is the second network 24 provided by the communication carrier 2, and is performing communication.

Further, it is assumed that the subscriber database management server (UDR) 102 has registered location information at the time of the UE 150 staying in the 5G area with the subscriber database 40 in advance.

FIG. 4A shows an example of a subscriber database 40A according to the one embodiment of the present disclosure. As shown in FIG. 4A, the subscriber database 40A can store the identification number (for example, an IMSI) of the UE 150 which is performing 5G communication, the location information, and the network radio type in association with one another.

The location information is information associated with a coverage area of a base station where the UE 150 is located, and includes an identification number of a mobility management node associated with a network of the area where the UE 150 is located, and an identification number of a communication carrier that provides the network. The location information is, for example, a fully qualified domain name (FQDN). The fully qualified domain name may be constructed by the UE 150 or may be provided by the communication carrier 2. The UE 150 is located in a coverage area of a base station of the 5G second network 24, and is connected to the AMF 138 via the NG-RAN 164. Therefore, when the location information about the UE 150 is a fully qualified domain name, the following is an example of the location information as shown in FIG. 4A.
AMF01.epc.mnc02.mcc440gppnetwork.org Here, "01" of "AMF01" is an identification number of the AMF 138 which is a mobility management node.

Further, "02" of "mnc02" is a mobile network code (MNC) and is an identification number of the communication carrier 2.

Further, "440" of "mcc440" is a mobile country code (MCC) and is an identification number of an operation area of the communication carrier 2.

Returning to FIG. 3, it is assumed that, at step S302, the UE 150 moves from the 5G coverage area where radio waves transmitted by a base station of the NG-RAN 164 reach to the 4G coverage area where radio waves transmitted by a base station of the E-UTRAN 162 reach while performing 5G communication. The UE 150 measures signal strength of radio waves transmitted by the base stations during the movement.

At step S304, when the signal strength from the base station of the 4G E-UTRAN 162 is equal to or larger than a predetermined value, or larger than the signal strength of the base station of the 5G NG-RAN 164, the UE 150 transmits a request for position registration with 4G to the UDR 102 via the E-UTRAN 162, the MME 118, and the HSS 112 in that order. In the present disclosure, when the same signal is transmitted via a plurality of nodes, it may be indicated by one step. For example, transmission from the UE 150 to the E-UTRAN 162, transmission from the E-UTRAN 162 to the MME 118, and transmission from the MME 118 to the HSS 112 of the position registration request at step S302 are indicated by the one step.

Each of the MME 118 and the HSS 112 registers a destination address of a transmission destination node to which the position registration request is to be transmitted in advance. For example, the MME 118 registers an address of the HSS 112 which is a position registration request transmission destination, and the HSS 112 registers an address of the UDR 102 which is a position registration request transmission destination in advance. When receiving the position registration request from the E-UTRAN 162, the MME 118 transmits the position registration request to the HSS 112 which is the registered destination. The HSS 112 transmits the position registration request to the UDR 102 which is the registered destination.

The position registration request includes the location information about and the terminal identification number of the UE 150. The position registration request may include a radio type of a connected network. As described above, the location information includes an identification number of a mobility management node associated with a network of an area where the UE 150 is located, and an identification number of a communication carrier that provides the network. At step S304, since the UE 150 is located in a coverage area of the 4G first network 22, the UE 150 connects to the mobility management node (the MME 118) via the E-UTRAN 162. Therefore, when the location information about the UE 150 is a fully qualified domain name, the following is an example of the location information.
MME01.epc.mnc01.mcc440gppnetwork.org Here, "01" of "MME01" of the fully qualified domain name is address information about the MME 118 which is a mobility management node. Further, "01" of "mnc01" is an identification number of the communication carrier 1. Further, "440" of "mcc440" is an identification number of an operation area of the communication carrier 1. According to the present disclosure, since the communication carrier 1 providing 4G services and the communication carrier 2 providing 5G services are different, mnc set at the time of 4G communication and mnc set at the time of 5G communication are different.

At step S304, the position registration request is transmitted from the UE 150 to the UDR 102 via the E-UTRAN 162, the MME 118, and the HSS 112 in that order. Each of the MME 118 and the HSS 112 corresponds to the control plane processing apparatus 110 which transmits/receives control signals for communication establishment and the like, and a data channel between the UE 150 and the 4G network has not been established at step S304. In order for the UE 150 to establish a data channel to the 4G network, the following processes of steps S306 to S324 are performed.

At step S306, the UDR 102 acquires the identification number of the communication carrier from the location information in the position registration request received at step S304. Further, the UDR 102 reads out an identification number of a communication carrier of a subscriber profile corresponding to the terminal identification number of the UE 150, from the subscriber database 40A. The UDR 102 judges whether the identification number of the communication carrier acquired from the location information in the position registration request and the identification number of the communication carrier read out from the subscriber database 40A are different from each other or not. When both are different from each other, the UDR 102 determines that the UE 150 has moved from a coverage area of a base station complying with a certain communication standard to a coverage area of a base station complying with another communication standard.

In the example of FIG. 4A, the identification number mnc of the communication carrier included in the location information, corresponding to the identification number "0001" of the UE 150 is "02". However, the identification number mnc of the communication carrier included in the location information in the position registration request is "01", and both are different from each other. Therefore, the UDR 102 determines that the UE 150 has moved from a 5G coverage area to a 4G coverage area.

At step S306, the UDR 102 further updates the location information corresponding to the UE 150 in the subscriber database 40 with the location information included in the acquired position registration request (the identification number mnc "01" of the communication carrier 1 and the identification number of "01" of the mobility management node MME). FIG. 4B shows an example of an updated subscriber database 40B.

At step S308, the UDR 102 gives a 4G data channel setting instruction to the MME 118 via the HSS 112. According to the present disclosure, a data channel setting instruction is not given from the UE 150 to the MME 118. Instead, the UDR 102 gives a data channel setting instruction to the MME 118. Thereby, even if there is not mutual connection between the MME 118 and the AMF 138, a channel from the 5G network to the 4G network can be set. The AMF 138 does not have to acquire the address information about the target MME 118.

Since steps S310 to S316 are a well-known 4G data channel setting process, detailed description thereof will be omitted. First, at step S310, the MME 118 transmits the 4G data channel setting instruction to the SGW 122. Next, at step S312, the SGW 122 performs the 4G data channel setting process between the SGW 122 and the UE 150, via the E-UTRAN 162. Further, the SGW 122 performs the 4G data channel setting process between the SGW 122 and the PGW-C 116/the PGW-U 124. Next, at step S314, the PCRF 114 sets QoS for the 4G data channel between the PCRF 114 and the PGW-C 116/the PGW-U 124. When setting of QoS for the data channel is completed, the PGW-C 116/the PGW-U 124 transmits a 4G data channel setting completion notification to the MME 118 via the SGW 122 at step S316.

Next, at step S318, the MME 118 notifies the UDR 102 of 4G data channel setting completion via the HSS 112. Unlike a conventional method in which the UE 150 is notified of data channel setting completion from the MME 118, the MME 118 gives a data channel setting completion notification to the UDR 102 in the present disclosure. By steps S310 to S318, connection from the E-UTRAN 162 to the SGW 122, and up to the PGW-C 116/the PGW-U 124 is completed.

Next, at step S320, the UDR 102 transmits a notification of completion of position registration with 4G and a parameter of switching from 5G to 4G, to the UE 150 via the HSS 112 and the MME 118. The switching parameter is a parameter that instructs the UE 150 to switch the data communication network connection destination. The switching parameter includes, for example, the type of the switching source network and the type of the switching destination network.

At step S322, when receiving the switching parameter, the UE 150 switches the connection destination from the 5G network provided by the communication carrier 2 to the 4G network provided by the communication carrier 1 according to the switching parameter. The user can automatically perform switching of the connection destination from the 5G network to the 4G network without manually operating the UE 150 to perform session disconnection/reconnection.

When the connection destination is switched, the UE 150 connects to the PGW-U 124/the PGW-C 116 via the E-UTRAN 162 and the SGW 122, establishes a data channel for 4G communication, with the 4G network ahead, and starts 4G communication at step S324. When U-plane data, that is, U-plane traffic from an external network to the UE 150 reaches the PGW-U 124 from the external network, the U-plane traffic can be transferred to the UE 150 via the PGW-C 116, the SGW 122, and the E-UTRAN 162.

Furthermore, at step S322, the UE 150 may hold a destination IP address of an external server with which the UE 150 has been communicating in the 5G network and use the destination IP address as a destination IP address of an external server at the time of performing communication in the 4G network. The external server is a server that provides the UE 150 with various kinds of application services such as a video distribution service. Further, the UE 150 may update the IP address of the UE 150 at the time of having been performing communication in the 5G network with an IP address assigned to the UE 150, which is included in the 4G position registration completion notification signal received at step S320. Thereby, at step S324, the UE 150 reconnects to the external server using the 4G data channel to continuously use the various kinds of application services.

Next, at step S326, the UE 150 transmits a notification showing that the UE 150 has started 4G communication, to the UDR 102.

Next, when receiving the notification showing that the UE 150 has started 4G communication from the UE 150, the UDR 102 transmits a 5G session disconnection instruction to the SMF 136, which is a session management node, via the UDM 132 at step S328. Next, at step S330, the SMF 136 transmits a 5G session disconnection setting instruction to the UPF 142. Next, at step S332, when receiving the session disconnection setting instruction, the UPF 142 performs a 5G data channel disconnection process between the UPF 142 and the NG-RAN 164, and the NG-RAN 164 performs the 5G data channel disconnection process between the NG-RAN 164 and the UE 150.

In the present embodiment, even if the AMF 138 does not acquire the address information about the MME 118 to be a target, that is, even if there is no interface between the AMF 138 and the MME 118, it is possible to hand over the UE 150 from the 5G network to the 4G network.

In the first embodiment, description has been made on the example in which the UE 150 moves from the coverage area of the second network 24 to the coverage area of the first network 22. In a second embodiment, description will be made on an example in which the UE 150 moves from the coverage area of the first network 22 (4G) to the coverage area of the second network 24 (5G).

Second Embodiment

Figure 5:
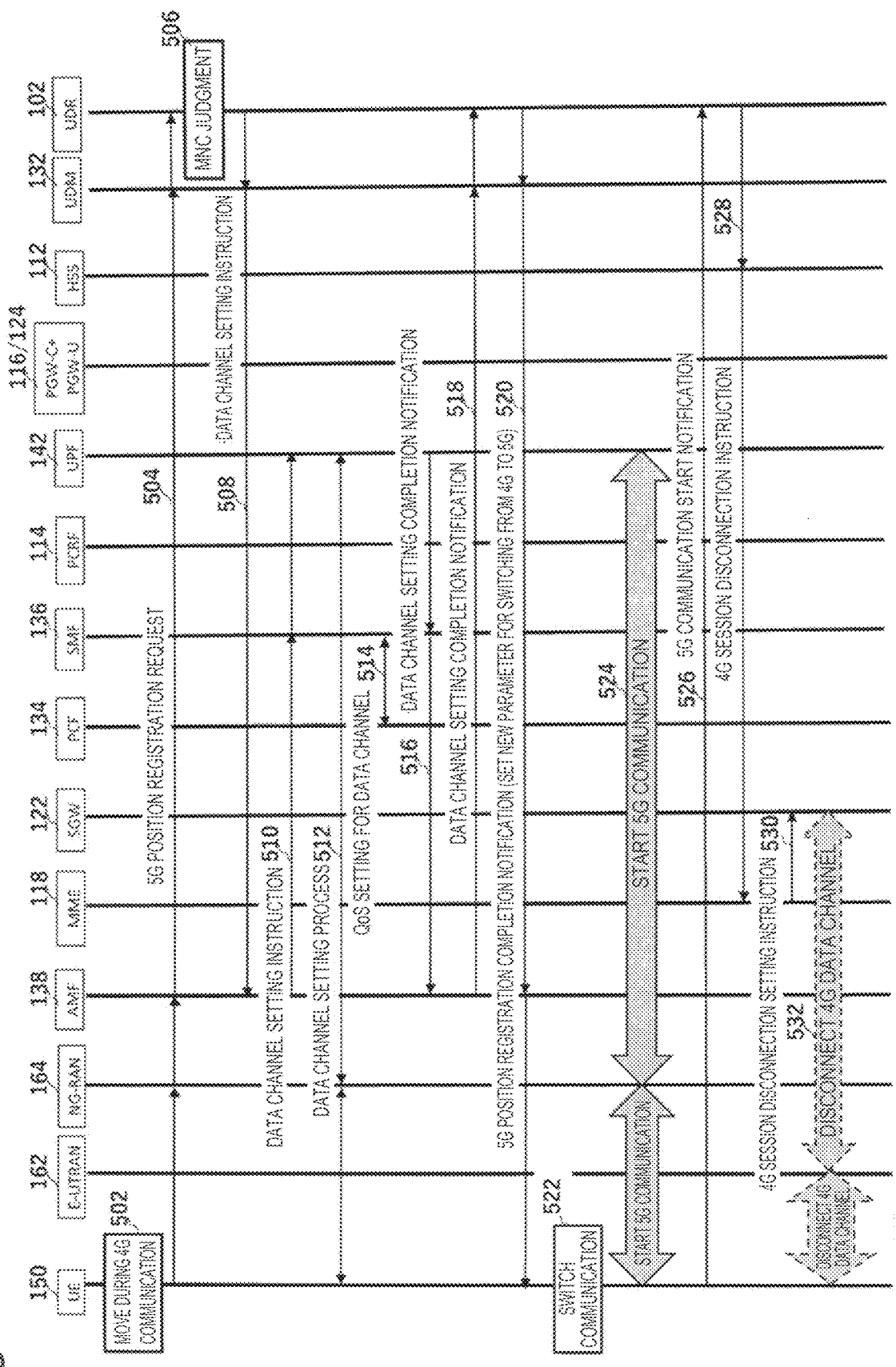
FIG. 5 is a sequence diagram of the network switching system according to the one embodiment of the present disclosure.
Figure 6:
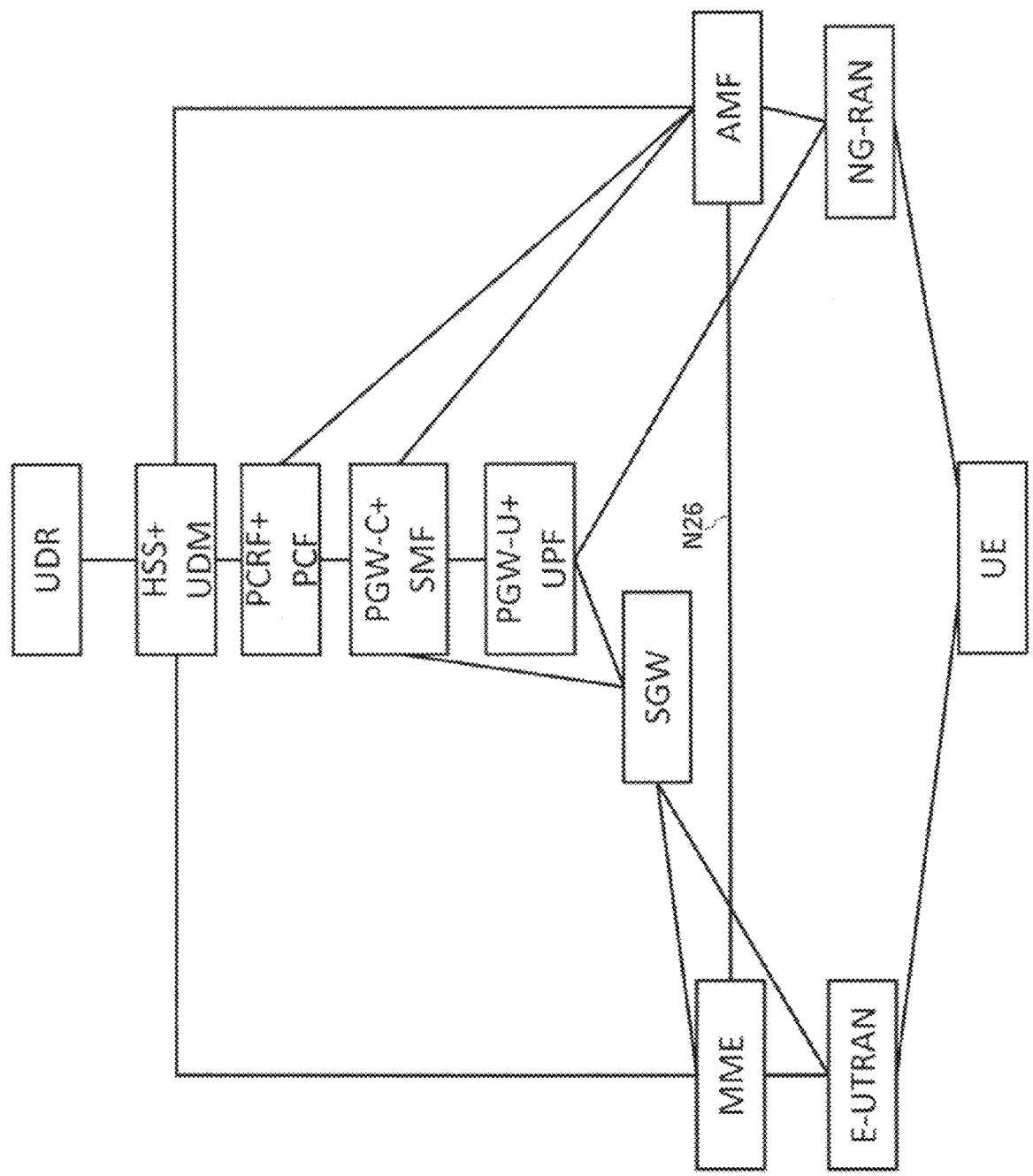
FIG. 6 shows a configuration example of a conventional architecture for mutual connection between 5G and 4G.
Figure 7:
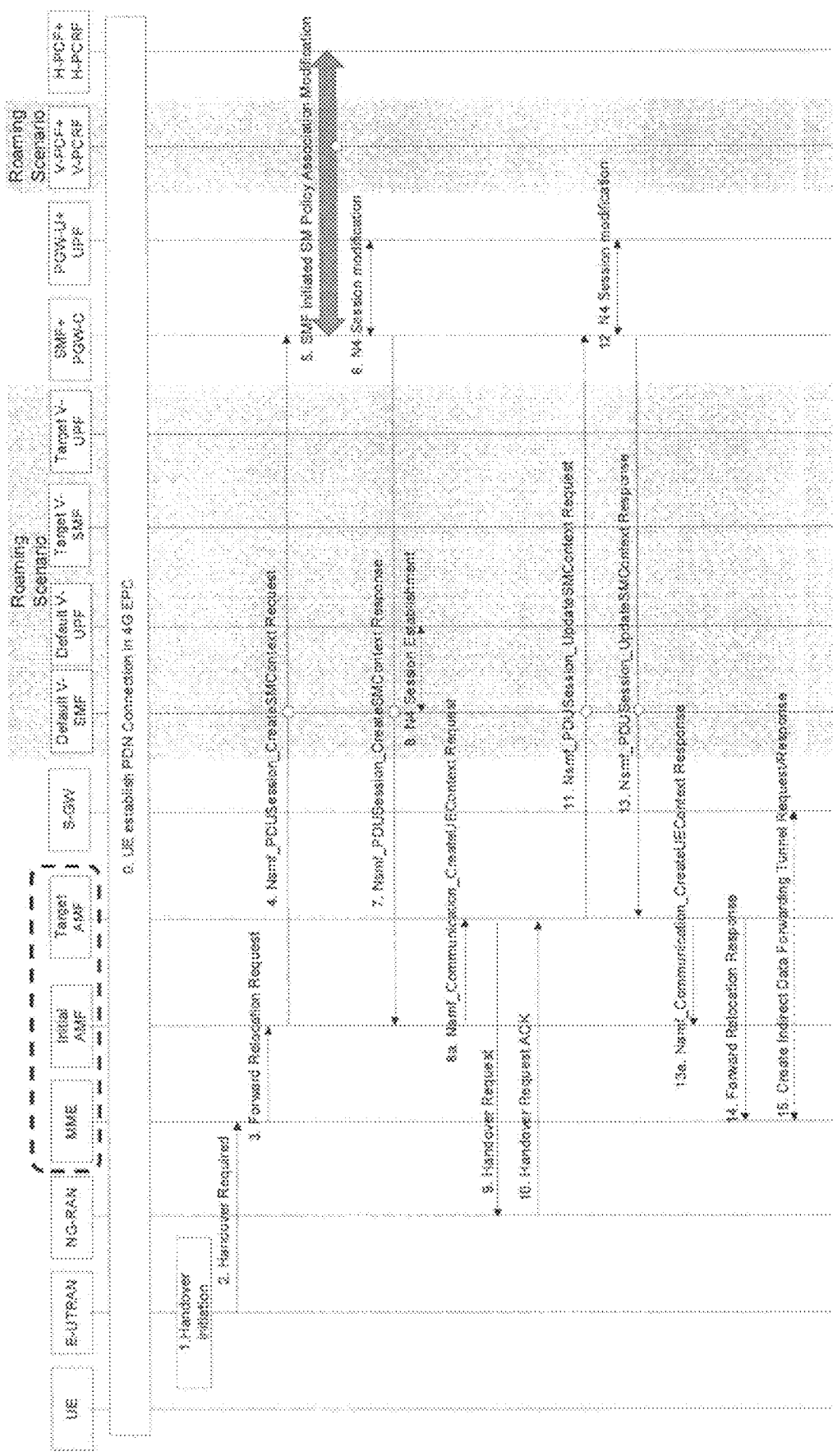
FIG. 7 exemplifies a conventional sequence for mutual connection between 5G and 4G.
Figure 8:
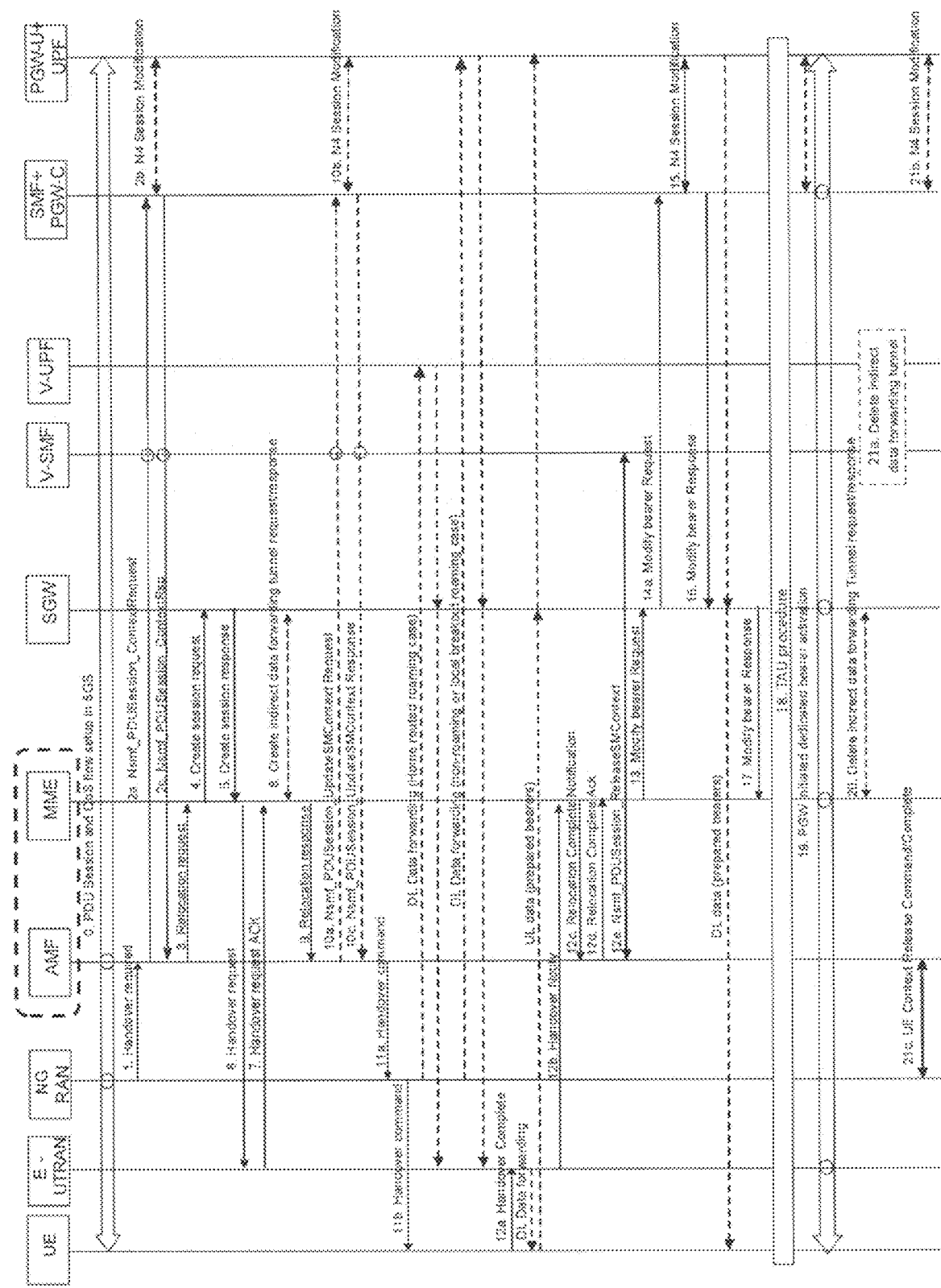
FIG. 8 exemplifies a conventional sequence for mutual connection between 5G and 4G.

In the second embodiment, description will be made on an example in which the UE 150 moves from the coverage area of the first network 22 complying with 4G to the coverage area of the second network 24 complying with 5G. FIG. 5 is a sequence diagram of the network switching system 200 shown in FIG. 2 according to the one embodiment of the present disclosure. The sequence in the second embodiment is a sequence at the time of the UE 150 moving from the 4G coverage area to the 5G coverage area and is different from the sequence at the time of the UE 150 moving from the 5G coverage area to the 4G coverage area in the first embodiment in components that perform processes, but the contents of the processes are almost the same.

It is assumed that, prior to the processes, the UE 150 is connected to the 4G network, which is the first network 22 provided by the communication carrier 1, and is performing communication.

Further, it is assumed that the subscriber database management server (UDR) 102 has registered location information at the time of the UE 150 staying in the 4G area with the subscriber database 40.

FIG. 4B shows an example of the subscriber database 40B according to the one embodiment of the present disclosure. As shown in FIG. 4B, the subscriber database 40B stores the identification number (for example, an IMSI) of the UE 150 which is performing 4G communication, location information, and the network radio type in association with one another.

The location information is, for example, a fully qualified domain name (FQDN). The UE 150 is located in a coverage area of a base station of the 4G first network 22, and is connected to the MME 118 via the E-UTRAN 162. Therefore, the following is an example of the location information about the UE 150 as shown in FIG. 4B.
MME01.epc.mnc01.mcc440gppnetwork.org It is seen from the location information that the UE 150 is connected to the MME 118 with the identification number "01" and is using the network of the communication carrier 1 with the identification number "01".

Returning to FIG. 5, it is assumed that, at step S502, the UE 150 moves from the 4G coverage area where radio waves transmitted by a base station of the E-UTRAN 162 reach to the 5G coverage area where radio waves transmitted by a base station of the NG-RAN 164 reach while performing 4G communication. The UE 150 measures signal strength of radio waves transmitted by the base stations during the movement.

At step S504, when the signal strength from the base station of the 5G NG-RAN 164 is equal to or larger than predetermined value, or larger than the signal strength of the base station of the 4G E-UTRAN 162, the UE 150 transmits a request for position registration with 5G to the UDR 102 via the NG-RAN 164, the AMF 138, and the UDM 132 in that order.

Each of the AMF 138 and the UDM 132 registers a destination address of a transmission destination node to which the 5G position registration request is to be transmitted in advance. For example, the AMF 138 registers an address of the UDM 132 which is a position registration request transmission destination, and the UDM 132 registers an address of the UDR 102 which is a position registration request transmission destination in advance. When receiving the position registration request from the NG-RAN 164, the AMF 138 transmits the position registration request to the UDM 132 which is the registered destination. The UDM 132 transmits the position registration request to the UDR 102 which is the registered destination.

The position registration request includes the location information about and the terminal identification number of the UE 150. At step S504, since the UE 150 is located in the coverage area of the 5G second network 24, the UE 150 connects to the mobility management node (the AMF 138) via the NG-RAN 164. Therefore, when the location information about the UE 150 is a fully qualified domain name, the following is an example of the location information.
AMF01.epc.mnc02.mcc440gppnetwork.org Here, it is seen from the location information that the UE 150 is connected to the AMF 138 with the identification number "01" and is using the network of the communication carrier 2 with the identification number "02".

At step S504, the position registration request is transmitted from the UE 150 to the UDR 102 via the NG-RAN 164, the AMF 138, and the UDM 132 in that order. Each of the AMF 138 and the UDM 132 corresponds to the control plane processing apparatus 110 that transmits/receives control signals for communication establishment and the like, and a data channel between the UE 150 and the 5G network has not been established at step S504. In order for the UE 150 to establish a data channel to the 5G network, the following processes of steps S506 to S524 are performed.

At step S506, the UDR 102 acquires the identification number of the communication carrier from the location information in the position registration request received at step S504. Further, the UDR 102 reads out an identification number of a communication carrier of a subscriber profile corresponding to the terminal identification number of the UE 150, from the subscriber database 40B. The UDR 102 judges whether the identification number of the communication carrier acquired from the location information in the position registration request and the identification number of the communication carrier read out from the subscriber database 40B are different from each other or not. When both are different from each other, the UDR 102 determines that the UE 150 has moved from a coverage area of a 4G base station to a coverage area of a 5G base station.

In the example of FIG. 4B, the identification number mnc of the communication carrier included in the location information, corresponding to the identification number "0001" of the UE 150 is "01". However, the identification number mnc of the communication carrier included in the location information in the position registration request is "02", and both are different from each other. Therefore, the UDR 102 determines that the UE 150 has moved from a 4G coverage area to a 5G coverage area.

At step S506, the UDR 102 further updates the identification number of the communication carrier of the subscriber profile in the subscriber database 40 with the location information included in the acquired position registration request (the identification number mnc "02" of the communication carrier 2 and the identification number of "01" of the mobility management node AMF). FIG. 4A shows an example of an updated subscriber database 40A.

At step S508, the UDR 102 gives a 5G data channel setting instruction to the AMF 138 via the UDM 132.

According to the present disclosure, a data channel setting instruction is not given from the UE 150 to the AMF 138. Instead, the UDR 102 gives a data channel setting instruction to the AMF 138. Thereby, even if there is not mutual connection between the MME 118 and the AMF 138, a channel from the 4G network to the 5G network can be set. The MME 118 does not have to acquire address information about the target AMF 138.

Since steps S510 to S516 are a well-known 5G data channel setting process, detailed description thereof will be omitted. First, at step S510, the AMF 138 transmits the 5G data channel setting instruction to the UPF 142 via the SMF 136. Next, at step S512, the UPF 142 performs the 5G data channel setting process between the UPF 142 and the UE 150, via the NG-RAN 164. Next, at step S514, the PCF 134 sets QoS for the 5G data channel between the PCF 134 and the SMF 136. When setting of QoS for the data channel is completed, the UPF 142 transmits a 5G data channel setting completion notification to the AMF 138 via the SMF 136 at step S516.

Next, at step S518, the AMF 138 notifies the UDR 102 of 5G data channel setting completion via the UDM 132. According to the present disclosure, unlike a conventional method in which the UE 150 is notified of data channel setting completion from the AMF 138, the AMF 138 gives a data channel setting completion notification to the UDR 102 in the present disclosure. By steps S510 to S518, connection from the NG-RAN 164 to the UPF 142, and up to the SMF 136 is completed.

Next, at step S520, the UDR 102 transmits a notification of completion of position registration with 5G and a parameter of switching from 4G to 5G, to the UE 150 via the UDM 132 and the AMF 138.

At step S522, when receiving the switching parameter, the UE 150 switches the connection destination from the 4G network provided by the communication carrier 1 to the 5G network provided by the communication carrier 2 according to the switching parameter. The user can automatically perform switching of the connection destination from the 4G network to the 5G network without manually operating the UE 150 to perform session disconnection/reconnection.

When the connection destination is switched, the UE 150 establishes, via the NG-RAN 164 and the UPF 142, a data channel for 5G communication to the 5G network ahead, and starts 5G communication at step S524. When U-plane data, that is, U-plane traffic from an external network to the UE 150 reaches the UPF 142 from the external network, the U-plane traffic can be transferred to the UE 150 via the NG-RAN 164.

Furthermore, at step S522, the UE 150 may hold a destination IP address of an external server with which the UE 150 has been communicating in the 4G network and use the destination IP address as a destination IP address of an external server at the time of performing communication in the 5G network. Further, the UE 150 may update the IP address of the UE 150 at the time of having been performing communication in the 4G network with an IP address assigned to the UE 150, which is included in the 5G position registration completion notification signal received at step S520. Thereby, at step S524, the UE 150 reconnects to the external server using the 5G data channel to continuously use the various kinds of application services.

Next, at step S526, the UE 150 transmits a notification showing that the UE 150 has started 5G communication, to the UDR 102.

Next, when receiving the notification showing that the UE 150 has started 5G communication from the UE 150, the UDR 102 transmits a 4G session disconnection instruction to the MME 118, which is a session management node, via the HSS 112 at step S528. Next, at step S530, the MME 118 transmits a 4G session disconnection setting instruction to the SGW 122. Next, at step S532, when receiving the session disconnection setting instruction, the SGW 122 performs a 4G data channel disconnection process between the SGW 122 and the E-UTRAN 162, and the E-UTRAN 162 performs the 4G data channel disconnection process between the E-UTRAN 162 and the UE 150.

In the present embodiment, even if the MME 118 does not acquire address information about the AMF 138 to be a target, that is, even if there is no interface between the MME 118 and the AMF 138, it is possible to hand over the UE 150 from the 4G network to the 5G network.

According to the present disclosure, even if the first network 22 complying with the first communication standard and the second network 24 complying with the second communication standard are possessed by different communication carriers, it is possible to perform seamless communication between the first network 22 and the second network 24 without mutual connection between the mobility management node 118 of the communication carrier 1 and the mobility management node 138 of the communication carrier 2. Therefore, even a communication carrier having a network complying with only one communication standard can provide a network complying with another communication standard to users.

Further, according to the present disclosure, mutual connection between the mobility management node 118 of the communication carrier 1 and the mobility management node 138 of the communication carrier 2 is unnecessary.

The present invention is not limited to the embodiments described above, and various changes are possible within a scope shown by the claims. An embodiment that is obtained by appropriately combining technical means disclosed in different embodiments is also included in the technical scope of the present invention.

The following abbreviated words are applied for the purpose of the present disclosure.

AMF: Access and Mobility Management Function
FQDN: Fully Qualified Domain Name
HSS: Home Subscriber Server
IMSI: International Mobile Subscriber Identity
MME: Mobility Management Entity
NG-RAN: Next Generation Radio Access Network
PCF: Policy Control function
PCRF: Policy and Charging Rules Function
PGW-C: Packet data network GateWay Control plane
PGW-U: Packet data network GateWay User plane
SGW: Serving Gateway
SMF: Session Management Function
UE: User Equipment
UDM: Unified Data Management
UDR: Unified Data Repository
UPF: User Plane Function
E-UTRAN: Evolved Universal Terrestrial Radio Access Network

REFERENCE SIGNS LIST 12 core network
14 core network
40(A/B) subscriber database
110 control plane processing apparatus
120 user plane processing apparatus
130 control plane processing apparatus 140 user plane processing apparatus
112 subscriber server (HSS)
114 PCRF
116 PGW-C
118 mobility management node (MME)
122 SGW
124 PGW-U
132 subscriber server (UDM)
134 PCF
136 SMF
138 mobility management node (AMF)
142 UPF
162 E-UTRAN
164 NG-RAN

The invention claimed is:

1. A method comprising:
acquiring, by a processor of an information processing apparatus, a position registration request from a user terminal;
judging, by the processor, whether a first identification number of a first communication carrier included in the position registration request is different from a second identification number of a second communication carrier associated with the user terminal, which is registered with a subscriber database;
instructing, by the processor, a mobility management node to set a first network of the first communication carrier when the first identification number of the first communication carrier is different from the second identification number of the second communication carrier registered with the subscriber database;
receiving, by the processor after setting of the first network is completed, a notification of completion of data channel setting for the first network from the mobility management node; and
transmitting, by the processor, in response to receiving the data channel setting completion notification from the mobility management node, a position registration completion notification and a parameter of switching from a second network to the first network, to the user terminal; wherein
the first network and the second network corresponding to the second identification number of the second communication carrier registered with the subscriber database comply with different communication standards.

2. The method according to claim 1, further comprising:
in response to receiving the position registration completion notification and the switching parameter, switching, by the user terminal, a connection destination from the second network to the first network.

3. The method according to claim 2, wherein
in response to receiving a notification showing that communication with the first network has been started from the user terminal, transmitting, by the processor, an instruction to disconnect a session to the second network, to a node performing session management of the second network.

4. The method according to claim 3, wherein
when signal strength from a base station of the first network is equal to or larger than a predetermined value or larger than signal strength from a base station of the second network, transmitting, by the user terminal, the position registration request to the information processing apparatus.

5. The method according to claim 1, wherein
the information processing apparatus is shared by the first network and the second network, and the first network and the second network separately comprise control plane processing apparatuses and user plane processing apparatuses, respectively.

6. An information processing apparatus comprising:
a processor; and
a storage unit storing an instruction, wherein
by executing the instruction stored in the storage unit, the processor is configured to:
acquire a position registration request from a user terminal;
judge whether a first identification number of a first communication carrier included in the position registration request is different from a second identification number of a second communication carrier associated with the user terminal, which is registered with a subscriber database; and
instruct a mobility management node to set a first network of the first communication carrier when the first identification number of the first communication carrier is different from the second identification number of the second communication carrier registered with the subscriber database,
receive, after setting of the first network is completed, a notification of completion of data channel setting for the first network from the mobility management node; and
transmit, in response to receiving the data channel setting completion notification from the mobility management node, a position registration completion notification and a parameter of switching from a second network to the first network, to the user terminal; wherein
the first network and the second network corresponding to the second identification number of the second communication carrier registered with the subscriber database comply with different communication standards.

7. A system comprising:
a first information processing apparatus comprising a first processor and a first storage unit storing a first instruction; and
a second information processing apparatus comprising a second processor and a second storage unit storing a second instruction, wherein
by executing the first instruction stored in the first storage unit, the first processor is configured to:
acquire a position registration request from a user terminal;
judge whether a second identification number of a first communication carrier included in the position registration request is different from a first identification number of a second communication carrier associated with the user terminal, which is registered with a subscriber database;
instruct a mobility management node to set a first network of the first communication carrier when the first identification number of the first communication carrier is different from the second identification number of the second communication carrier registered with the subscriber database;
receive, after setting of the first network is completed, a notification of completion of data channel setting for the first network from the mobility management node; and
transmit, in response to receiving the data channel setting completion notification from the mobility management node, a position registration completion notification and a parameter of switching from a second network to the first network, to the user terminal; and by executing the second instruction stored in the second storage unit, the second processor is configured to:

when signal strength from a base station of the first network of the first communication carrier is equal to or larger than a predetermined value or larger than signal strength from a base station of a second network of the second communication carrier registered with the subscriber database, transmit the position registration request to the first information processing apparatus, and the first network and the second network comply with different communication standards.

* * * * *